United States Patent
Olson et al.

[11] Patent Number: 6,012,110
[45] Date of Patent: Jan. 4, 2000

[54] APPARATUS AND METHOD FOR INPUT DATA LOSS PREVENTION WITH A BUFFERED UART

[75] Inventors: Gene H. Olson, Minneapolis; Ralph E. Richardson, Wayzata, both of Minn.

[73] Assignee: Digi International, Minnetonka, Minn.

[21] Appl. No.: 08/998,492

[22] Filed: Dec. 26, 1997

[51] Int. Cl.[7] .................................................. G06F 13/00
[52] U.S. Cl. .............................. 710/60; 710/46; 710/52; 710/109
[58] Field of Search .................. 709/250; 710/29–35, 710/46–64, 72–74, 107–110; 370/449

[56] References Cited

U.S. PATENT DOCUMENTS

| | | | |
|---|---|---|---|
| 4,388,686 | 6/1983 | Haid | 364/200 |
| 5,072,420 | 12/1991 | Conley et al. | 395/425 |
| 5,210,830 | 5/1993 | Olson | 395/109 |
| 5,247,617 | 9/1993 | Olson | 395/250 |
| 5,311,505 | 5/1994 | Antoime | 370/449 |
| 5,319,754 | 6/1994 | Meinecke et al. | 395/325 |
| 5,613,129 | 3/1997 | Walsh | 710/269 |
| 5,717,870 | 2/1998 | Dobson | 709/200 |

FOREIGN PATENT DOCUMENTS 0425845  10/1989  European Pat. Off. .

OTHER PUBLICATIONS

Messmer, H., "The Indispensable PC Hardware Book—Your Hardware Questions Answered", *Second Edition, Addison–Wesley Publishing Company*, (1995).

*Primary Examiner*—Christopher B. Shin
*Attorney, Agent, or Firm*—Schwegman, Lundberg, Woessner & Kluth PA

[57] ABSTRACT

An apparatus for handling data at two or more ports is described. In one embodiment, the apparatus comprises an apparatus for receiving data at multiple ports, each port having a buffer capable of holding B units of received data and being serviced by a processor resource. The apparatus has software causing the processor resource to have a polling session with each port and to read unread units of data from the buffer in each port during its polling session. It also has a counter for determining the number of units of data that have been read from the buffer and circuitry responsive to said counter to assert flow control from said port based on the number of units of data read.

33 Claims, 3 Drawing Sheets

Fig. 3a

| time in "character time" units | 0 0 0 0 0 0 0 0 0 0 1 1 1 1 1 1 1 1 1 1 2 2 2 2 2 2 2 2 2 2 3 3 3 3 3 3 3 3 3 3 4 4 4 4<br>0 1 2 3 4 5 6 7 8 9 0 1 2 3 4 5 6 7 8 9 0 1 2 3 4 5 6 7 8 9 0 1 2 3 4 5 6 7 8 9 0 1 2 |
|---|---|
| start of polling intervals | \|                \|                  \|<br>1st                2nd               3rd |
| No. of UART being serviced | 01234567    0011223344556677    01234567 |

Fig. 3b

| time in "character time" units | 0 0 0 0 0 0 0 0 0 0 1 1 1 1 1 1 1 1 1 1 2 2 2 2 2 2 2 2 2 2 3 3 3 3 3 3 3 3 3 3 4 4 4 4<br>0 1 2 3 4 5 6 7 8 9 0 1 2 3 4 5 6 7 8 9 0 1 2 3 4 5 6 7 8 9 0 1 2 3 4 5 6 7 8 9 0 1 2 |
|---|---|
| start of polling intervals | \|                \|                                   \|<br>1st                2nd                                   3rd |
| No. of UART being serviced | 01234567    00001111222222333334444445555566666677777700000001    3rd |

APPARATUS AND METHOD FOR INPUT DATA LOSS PREVENTION WITH A BUFFERED UART

BACKGROUND OF THE INVENTION

1. Field of the Invention

The present invention is a method and apparatus for controlling input data flow into an asynchronous serial data communication device with a buffered parallel interface of limited bandwidth.

2. Description of the Prior Art

A wide variety of asynchronous communication devices are conventionally connected to host computer systems. Generally, this connection has been made using an integrated chip device known as a UART, an acronym for Universal Asynchronous Receiver Transmitter. A UART connected to a host computer system permits the host computer to send or receive units of data or information, usually called characters. UARTs generally receive data one character at a time, with the character transmitted serially, one bit at a time. Most operate under the control of a program on the host processor to which they are connected. This program may poll the connected UARTs to determine whether they are ready to receive or transmit another character. The host processor may also take interrupts from UARTs, with each UART issuing an interrupt when it is ready to receive or transmit another character.

UARTs have evolved into three functional types: (1) unbuffered UARTs, (2) buffered UARTs, and (3) direct memory access (DMA) UARTs. Each of the UART types below represents a trade-off in expense, speed, need for host processor servicing and the risk of lost data when used in high speed communication. The latter risk is increasingly significant, because of the great increase in networking, data communications traffic and transmission speeds. Many host systems are now connected to many different high-speed communication devices, including other computers, so that the volume of incoming data transmission at peak times could easily overwhelm the host processor, causing data loss.

1. Unbuffered UARTS

This type of UART has a transmit holding register linked to a transmit shift register that is connected to the telecommunications line. The transmit shift register can take in data bit-by-bit from the communication line or it can transmit data bit-by-bit onto the communication line. To send a character, the host processor stores it in the transmit holding register. When the transmit shift register becomes empty, the internal UART logic moves the next character from the transmit holding register to the transmit shift register. The character is then shifted and transmitted a bit at a time until it is completely transmitted. In order to maintain full speed operation, by the time transmission of one character is complete the processor must have stored another character into the transmit holding register so that it will be ready to be moved to the shift register and transmitted. Thus, transmission speed suffers when the processor is not able to keep the transmit holding register filled.

When receiving a character, the UART shifts data a bit at a time into a receive shift register. When a complete character has been received, the internal UART logic moves the character to a receive holding register where the host processor can read it. If the processor has not read that character by the time the next input character is fully received into the shift register, then the next character overwrites the character in the receive holding register, causing data loss. To avoid this, the processor must arrange to read each character arriving in the receive holding register within one input character arrival time. Accordingly, processor speed and polling or interrupt servicing of the UART must be adequate. Specifically, this type of UART requires the processor to service the asynchronous line at the incoming character transmission rate. Most often there are 10 bits/character. Thus, if a transmission line runs at 9600 baud, the host must service the UART 960 times/second.

2. Buffered UARTs

These UARTS improve the above design by replacing the transmit or receive holding registers with a FIFO (First-in-First-out) buffer. Due to the cost of buffer storage, early, inexpensive UARTs often had buffer storage for only 2–3 bytes. Newer UARTs most often have buffers of 16–64 bytes. Buffered UARTs can significantly reduce the servicing demands on the processor running the servicing program. For example in a UART with 16 byte receive and transmit buffers, the processor in theory only needs to service the chip every 16 characters, greatly reducing processor overhead caused by execution of the UART servicing routines.

3. DMA UARTs

These UARTs improve both the above designs by providing on-chip DMA circuitry to transfer incoming and outgoing data directly to host processor memory without interaction from the processor. This type of UART provides extremely high performance with low processor overhead, but requires much more expensive hardware. The UART chip must be provided with full bus access circuitry, and the processor memory subsystem must allow DMA access. For this reason, such UART chips are generally much more expensive. Thus, while DMA UARTs may help solve the problem of lost incoming data, they are not cost effective in many applications.

When designing nearly all types of data communication systems, it is necessary to prevent a sender from sending an unlimited amount of data to a slow receiver, causing data loss. The method for doing this is called flow control. It is usually implemented so that when the receive buffers contain more than a specified amount of data, the receiver requests the sender to stop transmitting temporarily, until the receive buffers can be emptied. Such requests to the sender can be in-band or out-of-band signals. To request the sender to stop with an in-band signal, the receiver may send an XOFF character, and then inform the sender to resume by sending an XON character. Conversely the receiver may request the sender to stop by dropping the out-of-band signal CTS (Clear to send) when the buffer becomes full, and then raising the CTS again when some of the data has been drained from the buffer.

It would seem natural to eliminate the lost data problem in communication systems by using flow control to tell the sender to slow down when the receiver is unable to remove received data from the UART buffers quickly enough to prevent data loss. Unfortunately, this solution will seldom work in practice, unless the flow control mechanisms are built into the UART hardware. In most cases, the receiving system recognizes that it has fallen behind in removing data from the UART only when the UART signals that data has already been lost. At that point it is too late to do anything about it. It is also common for the sender to delay in stopping data after receipt of the flow control signal, further complicating the problem. The stopping period is referred to as the "skid" interval, and for common computer systems is often 16 bytes.

A group of UARTs is often serviced by one processor. This requires that the processor have a polling and servicing method that permits it to service all UARTs, which at any given time may have widely varying transmit and receive traffic. In this arrangement, it is common to design a system so that adequate processing and memory bandwidth is provided to handle an average communication load, but not necessarily the worst case bi-directional load on all ports simultaneously. Such a system provides excellent performance at minimum cost, but may lose data under unusually high load conditions.

In the prior art, it has been proposed to optimize the operation of a group of UARTs by introducing certain features into the software that controls the UARTs. In U.S. Pat. No. 5,210,830, operation of a multiport communications processor is optimized by dynamically configuring the UART polling loop with at least one jump table. In U.S. Pat. No. 5,247,617, transmit polling of buffered UARTs is improved by predicting, for each polling interval, the minimum number of characters needed to keep the transmitter from going idle before the next polling interval and placing exactly that many characters in the transmittal FIFO buffer.

In the prior art, it has also been proposed to exercise flow control for incoming data based on the level of characters in the receive buffer of a UART. The UART is designed to assert flow control when the UART receive buffer contains more than a specified number of characters (the high water mark) and then release flow control when the number of characters drops below a different, smaller number (the low water mark). However, if the levels selected do not fit the application well, then receive buffer overflow and data loss can still occur.

SUMMARY OF THE INVENTION

The invention utilizes a novel flow control technique to eliminate data loss when the receiving processor in a buffered UART system is inadequate to handle peak load conditions. The invention allows the receiver to signal the sender to pause transmission in time to prevent data loss.

An apparatus for handling data at two or more ports is described. In one embodiment, the apparatus comprises an apparatus for receiving data at multiple ports, each port having a buffer capable of holding B units of received data and being serviced by a processor resource. The apparatus has software causing the processor resource to periodically poll each port and to read unread units of data from the buffer in each port during each poll. It also has a counter for determining the number of units of data that have been read from the buffer and circuitry responsive to the counter to assert flow control from that port based on the number of units of data that have been read from the buffer.

The invention also encompasses a method for controlling data received at two or more ports, each port having a buffer capable of holding B units of data and being serviced by a processor resource. The method includes causing the processor resource to periodically poll each port and to read unread units of data from the buffer in each port during each poll. The method determines the number of units of data read from the buffer and asserts flow control from that port based on the number of units of data that have been read from the buffer.

DESCRIPTION OF THE DRAWINGS

FIGS. 3a and 3b show time lines for two different UART polling and servicing situations that may be encountered by the present invention.

DETAILED DESCRIPTION

1.0 General Overview

Figure 1:
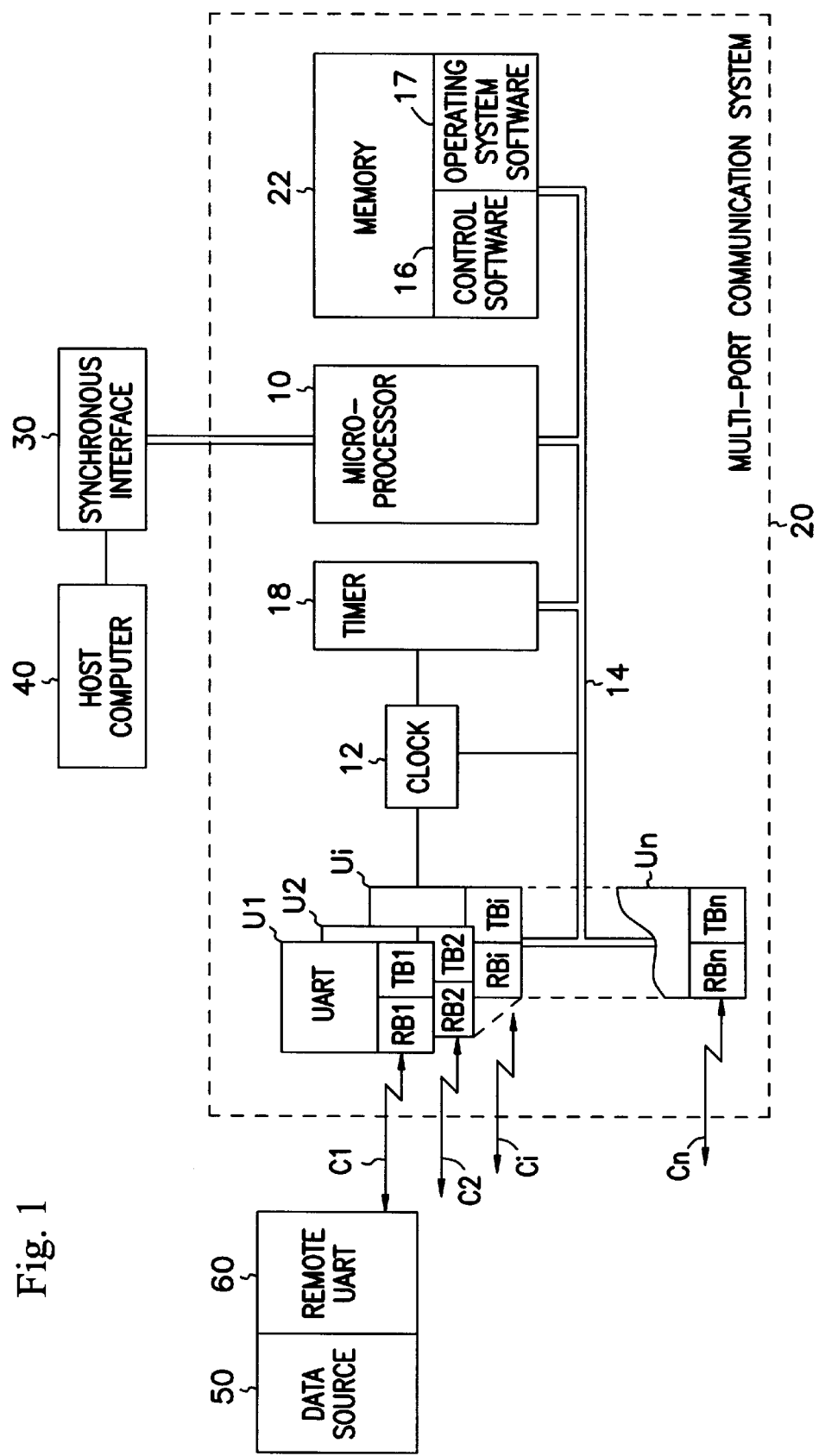
FIG. 1 is a block diagram of one apparatus embodiment of the present invention, shown in an environment in which it might operate.

Referring to FIG. 1, one embodiment of the invention will be described. An asynchronous multi-port communication system 20 has a number of communication ports. Each port has one of the UARTs U1, U2, . . . Ui, . . . Un attached to it. By way of example, each UART may be a model ST 16C654 (or other 1665x model) from Startech Semiconductor, Inc. of Sunnyvale, Calif. Each UART Ui receives a clock signal from clock 12 that determines the basic frequency at which the UART Ui operates. Each UART Ui is controlled and serviced by a processor resource 10. The clock 12 also drives periodic timer 18 that can be used to schedule the start of service or polling intervals under control of the processor resource 10. Each UART Ui communicates with address and control bus 14. System memory 22 is also in communication with bus 14 to deliver or receive characters to or from UARTs U1, U2, . . . Ui, . . . Un. System memory 22 is the storage location for the operating system software 17 for the processor resource 10, as well as the control software 16 for UARTs U1, U2, . . . Ui, . . . Un. The control software 16 may be in any computer-readable medium.

In one embodiment processor resource 10 may be linked to a synchronous interface 30 that transmits data packets to a host computer 40. However, the multi-port communication system 20 may be used in a variety of environments.

For purposes of the present invention the processor resource 10 is assumed to have insufficient speed to handle all incoming data that is directed to it, if transmission at the maximum data rate were to occur simultaneously at each of the UARTs U1, U2, . . . Ui . . . Un. This insufficiency can result from a variety of reasons. The processor resource 10 may for reasons of expense be slower than the fastest processors available. The processor may have been sized to handle a certain number of ports and have had more ports added. Or the processor may have been sized to handle a given data rate at each port and the given data rates may have increased temporarily (e.g., unusually high message traffic) or as a permanent trend (e.g., faster modems installed, baud rate of the UARTs increased).

Each UART U1, U2, . . . Ui. . . Un has a receive buffer RB1, RB2, . . . RBi . . . RBn and a transmit buffer TB1, TB2,. . . TBi . . . TBn. Each UART U1, U2, . . . Ui. . . . Un is also connected to a communication line C1, C2, . . . Ci, . . . Cn leading to a remote data source 50. While each UART U1, U2, . . . Ui, . . . Un is capable of both sending and receiving data, the focus of this invention is on the receive function, where the problem of buffer overflow leading to lost data arises. In the model ST 16C654 from Startech, each buffer holds 64 bytes. The characters received through this buffer are output by the asynchronous port concentrator 20 to a synchronous interface 30 that prepares them for input to a host computer 40.

2.0 Causes of Buffer Overflow

The signals received by each UART U1, U2, . . . Ui, . . . Un typically come from a remote UART 60 at the other end of a communication line C1, which is attached to a data source 50. (By way of example, only one remote UART 60 and data source 50 are shown, connected to line C1.) The data source 50 may be a remote computer or an input/output device, such as a disk drive. Thus, the port concentrator 20 must handle asynchronous communications that come in from a number of communications lines, whose transmission loads may vary widely from time to time. By way of example, a configuration with sixteen UARTs and lines will be discussed initially to show how one embodiment of the invention might address buffer overflow.

If there are sixteen UART's U1, U2, . . . Ui, . . . Un in multi-port communication system 20 and each is connected to a remote UART 60 capable of sending data at the rate of 230 kilobaud (with 10 bits per character), then if all remote UARTs 60 sent data at once, the UARTs U1, U2, . . . Ui, . . . Un and the processor resource 10 would need to handle about 368,000 characters per second. But if the processor resource 10 is a 25 MHz 80186 processor and it polls the UARTs U1, U2, . . . Ui, . . . Un at the rate of 1440 times a second, removing 16 characters from each UART, it will not be able to keep up with the maximum possible receiving rate, even if it could dedicate itself solely to moving characters out of the receive buffers RB1, RB2, . . . RBi, . . . RBn. Depending on the other tasks that the processor resource 10 must also address and the number of other instructions that must be executed for such other tasks, the processor resource 10 may have significant intervals when it is not available to service the UARTs U1, U2, . . . Ui, . . . Un in a timely fashion. In those intervals, each UART may be receiving data, and the processor resource 10 will fall behind and lose data, unless there is some action taken to prevent incoming data from continuing to enter the receive buffers RB1, RB2, . . . RBi, . . . RBn.

3.0 Flow Control

To address the possible buffer overflow problem, the present invention uses a procedure implemented primarily in software 16 to control the servicing that the processor resource 10 provides to the UARTs U1, U2, . . . Ui, . . . Un. The control software 16 is stored in memory 22 along with the operating system 17, which must also be executing on the processor resource 10.

For purposes of further explanation, it is useful to establish two terms. As used herein, "polling interval" means a specified time interval in which the processor resource 10 is to service all UARTs under its control. (There are sixteen UARTs in our example.) The term "polling session" refers to the time interval during which any one UART is serviced. The duration of a "polling session" varies according to how many characters are read. As can be seen, depending on the duration of any other polling sessions that must occur before any UART is serviced, its polling session will fall earlier or later within the nominal polling interval (or, in overload situations, may fall outside of that interval).

FIGS. 3a and 3b show time lines for two different UART polling and servicing situations that may be encountered by the present invention. The first two lines in each of FIGS. 3a and 3b are the time scale in character times (the amount of time it takes to receive one character in a receive buffer RBi) from 00 to 42. The next line with the vertical bars shows the beginning of the first, second and third polling intervals, each of which is nominally every 16 character times. The final line shows hypothetically when each UART in a simplified eight UART system (U0=0, U1=1, etc.) is polled and how long it took to poll it (multiple digits in a row, e.g., "11" indicate a longer service time for U1 than a single digit, e.g., "1"). The time to service each UART is not related to the character time (baud rate).

Referring to FIG. 3a, at time 00, all the UARTs have relatively empty receive buffers and they are all serviced by time 03.5. Now a stream of data comes in between time 04 and time 16 start of the second polling interval). At time 16 FIG. 3a shows each UART taking twice as long to service as before. Thus, one can see that the relative time between U7 being serviced the first time and the second time is about 23.5−3.5=20 character times, which is 4 character times longer than the nominal 16 character times for a polling interval.

If FIG. 3a showed the worst case, then the present invention would not be needed. The processor resource 10 could always handle servicing of all UARTs in each polling interval. But if the incoming data rate times number of UARTS is "high", or the processor is "slow", or both, then while one UART is being serviced, the receive buffers of other UARTs will start to fill. The situation can build and could turn into that shown in FIG. 3b.

In FIG. 3b, we account for the fact that U0 has a nominal 16 characters in its receive buffer at the beginning of the second polling interval period, but the processor resource takes slightly longer than ⅛th of a nominal polling interval (i.e., two character times) to process those characters from the receive buffer. During this processing, characters continue to be received in the receive buffers of U2, . . . U7, and the increased number of incoming characters must be serviced. Thus, each subsequent UART serviced after U0 has more characters in it than the previous UART. The time units needed to service each UART increases from four ("1111"), to five ("22222"), then to six ("444444") and seven ("6666666").

FIG. 3b, by way of example, shows there are about 31 character times between servicing U7 the first and the second time, so in this example, to empty U7's receive buffer, the processor resource will have to pull 31 characters from U7, not the nominal 16 characters. In addition, as can be seen, the service time for all UARTs took longer than the nominal poll period, P=16, delaying the start of the third polling interval from the nominal start at time 32 (as in FIG. 3a).

FIG. 3b also shows the cumulative effect of delaying the third service session. The number of time units needed to service UART 0 has now increased to eight ("00000000"). Subsequent UARTs may now require even more character times.

As can be seen, the processor resource has fallen behind and the situation will continue to worsen until data is lost, or the flow of characters into the UARTs is reduced. This is the situation in which the present invention comes into play.

The procedure of the present invention is based on finding an appropriate set of trade-offs, balancing three primary considerations. First, although the processor resource 10 should ideally empty each receive buffer RBi of all characters it contains in each polling session, this ideal conflicts with the need to get on to the next buffer RBi+1, which may be almost full and still being filled at a fast rate. If the processor 10 gives too long a polling session to any one UART, then the buffer RBi of one or more other UARTs (which may continue to receive data) may overflow. Second, although the processor can at any time assert flow control to the remote UART 60 at the other end of the transmission line, this is to be avoided, except when necessary. Not only does this stop the transmission that one or more remote UARTs 60 is trying to accomplish, reducing the overall transmission rate of the communications lines Ci, but it adds to the burden of processor resource 10 the overhead of additional instructions associated with transmission of the stop and restart signals. Third, while it would be desirable to wait to see if a buffer RBi will actually be filled before it can be serviced, such an event cannot be reliably detected in this polled environment; also a flow control signal must be sent to the remote UART 60 at the other end of the transmission line well in advance of the buffer RBi actually being filled, because the flow control signal will not have any effect until a number of additional characters have been sent.

There are two reasons for the latency of the flow control signal. First, if software flow control is used, then the transmission of the flow control character could be delayed by the sending UART because the transmitter FIFO already contains a number of characters which must be transmitted first. For many popular UARTs, as well as for this implementation, the delay could be 1 to 16 character periods. Second, the receiver of the flow control signal could also be using a polling process to empty its receive FIFO and to check the flow control signal. For many popular UARTs and implementations, the sending UART may send up to 16 additional characters after the flow control signal is received. When both sources of latency are considered, up to 32 character times of delay could occur before the remote transmitter actually stops sending data.

To balance the above considerations and reduce the probability of buffer overflow to an acceptably low level, the following general procedure is followed. Note that this example assumes a UART baud rate of 230 kilobaud (about 23,000 characters per second) and 16 UARTs serviced by the processor resource 10. In addition, the unit of data transmitted is assumed to be a 10 bit character. The same principles operate for other baud rates, other units of data and other number of UARTs serviced, where the processor resource 10 is not able to keep up.

1. The "polling interval" for received characters is set as a constant period that is dependent upon the maximum incoming character speed, the number of processor clock cycles it takes to read one character from a UART, the number of UARTs to be polled, and the size "B" of the receive buffer RBi minus the worst case latency of the flow control signal. For example, with an RBi buffer size "B" of 64 characters and a worst case flow control signal latency of 32 character times, the "polling interval" can not exceed 64−32=32 character times. However, the polling interval must be further reduced due to relative variations in the time that each individual polling session for Ui begins, so that no more than 32 characters (the flow control latency) can ever accumulate in RBi. In addition, the polling interval must not be set too low, as this increases the average number of processor cycles required to process each received character. For the example implementation, a nominal polling interval of 16 character times is used. For a maximum UART baud rate of 230 kilobaud, that works out to a polling interval of 1/1440 of a second to poll all 16 UARTs. It is useful to think of the "polling interval" as a time nominally equivalent to "P" character times. So for this example, "P" is 16 character times.

2. Starting with U1 and moving on to each Ui, the processor resource 10 tests to see if there are any unread characters in the receive buffer RBi.

3. As the processor resource 10 reads any characters it finds in each receive buffer RBi, a character count (CC) is kept.

4. During the polling of any one Ui having unread characters, the processor may read up to N characters, with N being the Read Limit. The Read Limit N is a configurable value, selected empirically, as described below. It will normally be greater than the nominal servicing rate, "P", but it must be less than or equal to the full capacity of the buffer, reduced by the worst case latency of the flow control signal. The processor resource 10 is permitted to read up to N characters before it must move on to start reading characters from the next UART. It will stop reading before all characters in RBi are read if the Read Limit is reached, i.e., once N characters have been read.

5. In addition to stopping reading from the buffer RBi at the Nth character, the processor resource 10 asserts flow control for the communication line Ci that feeds RBi; that is, the processor resource 10 asserts flow control based on the number of characters (units of data) read from the buffer. The processor resource 10 causes a flow control signal to be sent to the remote UART 60 to inhibit further transmission. As noted above, this can be done by hardware or software. Software flow control is performed by a UART sending and receiving XON/XOFF characters to restart/stop, respectively, transmission. Hardware flow control generally raises or removes one or more control lines that are part of the communications interface. In determining timing, the software designer must consider that there is a difference in the latency of the flow control signal between software and hardware flow control. Because software flow control requires the transmission of a character, and the UART transmitter also has a buffer of depth B and a nominal polling rate of P character times, the software flow control character to stop the remote end may be delayed; P characters may already be in the transmit buffer and have to be transmitted first. Hardware control does not involve this delay but will still have some latency.

As noted above, the Read Limit is configurable, based on empirical evidence. The Read Limit value N is determined by using a benchmarking program that supplies characters to the UARTs U1, U2, . . . Ui, . . . Un at their maximum baud rate. At some point, the processor resource 10 will not be able to keep up and data loss can be observed. This indicates that flow control should have been asserted. The Read Limit value is adjusted downward from its maximum value, B (the maximum number of characters RBi can hold without overflow), until the flow control triggered by the selected Read Limit N is such that no receive buffer RBi is pushed into overflow and data loss. This is one method for empirically determining the number N to reduce the probability of buffer overflow to an acceptably low level. Others are possible based on statistical principles. Where the opportunity for recovery and retransmission exists, it may be cost-effective to risk an occasional loss of characters by buffer overflow.

For a 25 MHz 80186 processor servicing 16 model ST 16C654 UARTs from Startech Semiconductor, Inc., clocked with a baud rate of 230 kilobaud and polled with a nominal polling interval of P=16, N=19 has been found suitable. With a faster processor resource 10, it would be expected that a higher value of N could be used. With modems having a baud rate lower than 230 kilobaud, it would likewise be expected that a higher value of N could be used.

Operation of the method of the present invention is explained by reference to the flow chart of FIG. 2. At the starting step 100, the index value i that designates which UART is being polled is set to one. At step 102, the processor resource 10 polls Ui and at step 104 a character counter (CC) is set to zero. At step 106, at the beginning of the polling session for Ui, the processor checks for unread characters in the receive buffer RBi. (In the ST 16C654 UART, this is done by testing bit 0 of the line status register.) If there is an unread character, at step 108 that character is read from RBi. At step 110 CC is incremented by one. At step 112, CC is tested to see whether it is greater than or equal to the Read Limit N. If the Read Limit has not yet been reached, then control returns to step 106, where the processor resource 10 again checks for unread characters in the receive buffer RBi.

Reading of unread characters continues until CC it is greater than or equal to the Read Limit N. At this point the polling session ends and control goes to step 114, where flow control is asserted (e.g., by sending XOFF) and a flow control flag is set for Ui. Then the index value i is incremented at step 122 and at step 124 index i is tested to determine whether all UARTs Ui have been serviced. If so, that polling interval ends at step 126. Depending on its other tasks, the processor resource may then execute instructions for other tasks, or it may immediately begin another polling interval at step 100.

If at step 106 it is determined that there are no unread characters (i.e., the receive buffer RBi is empty), at step 116 the software checks to see whether flow control has been asserted for this Ui, by checking to see whether the flow control flag for this Ui is set. If so, flow control is de-asserted at step 118 (e.g., by sending XON). At step 120, the flow control flag for this Ui is un-set and the polling session for the current Ui ends. Next, control goes to steps 122 and 124 to continue with a polling session for each other Ui not yet polled in this polling interval. If at step 116 no flow control flag were found to be set, control again goes to steps 122 and 124.

Figure 2:
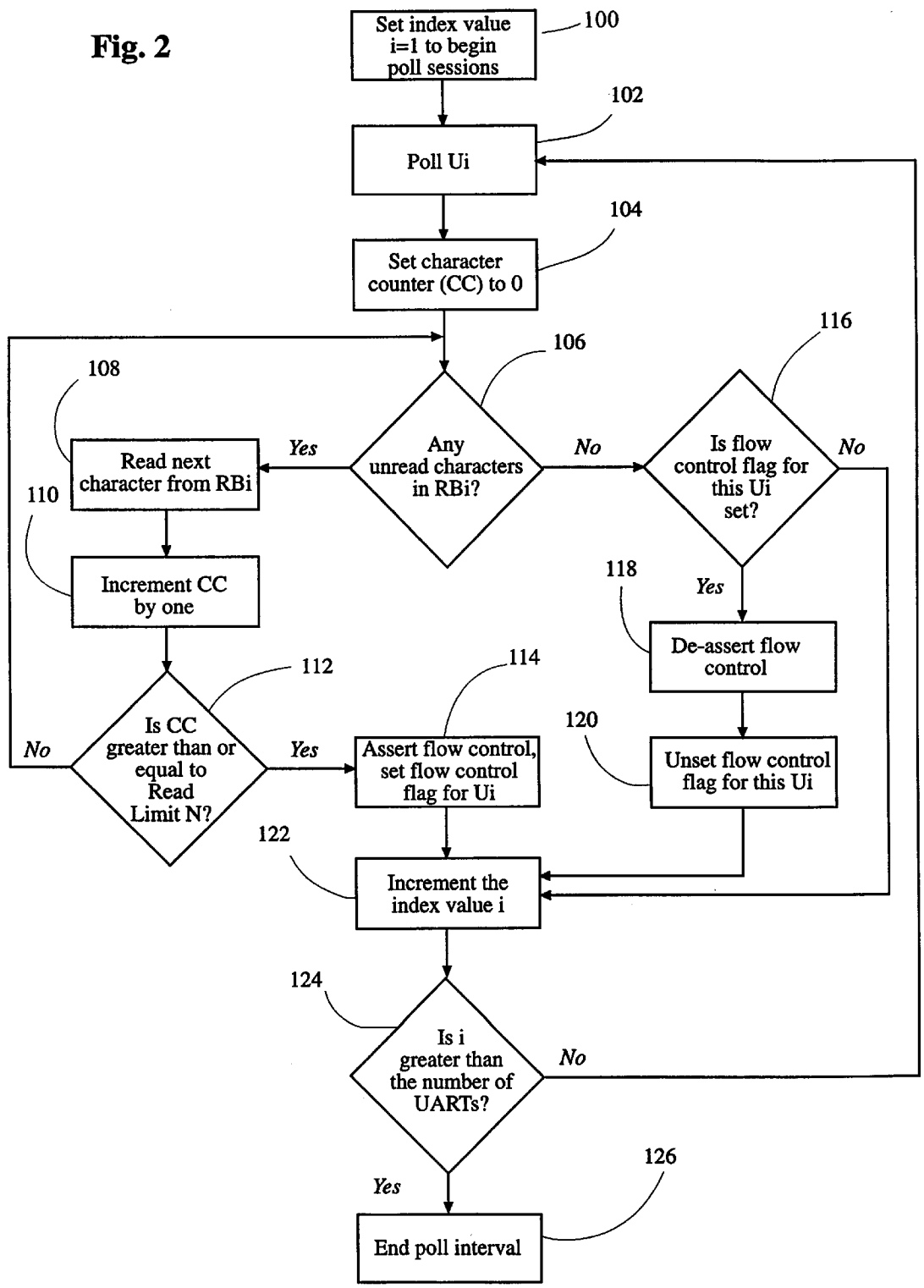
FIG. 2 is a flow chart of one method embodiment of the present invention.

In a variation of the method shown in FIG. 2, flow control can be de-asserted gradually. This is done by de-asserting in any one polling interval less than all the flow control that has been asserted. For example, if it has been necessary to assert flow control on all sixteen UARTs U1, U2, . . . Ui, . . . Un, it may be desirable to de-assert flow control on only the first two that are eligible for de-assertion. This would be implemented in the software by a counter that keeps track of how many flow control flags have been un-set in any polling interval and inhibiting further un-setting, once a limit value of two (or other selected threshold, L) has been met.

The present invention has been described relative to operation with the model ST 16C654 UARTs from Startech Semiconductor, Inc. However, it will be apparent to those skilled in the art that the present invention may be used with other buffered UARTs and with other asynchronous receive/transmit chips that have receive buffers that require servicing by a processor resource that, for one reason or another, may not be able to handle peak incoming transmissions, and that other forms, details and modifications may be made to the present invention to conform the present invention thereto. For example, the invention works with baud rates other than the 230 kilobaud rate shown in the example and with more or less than 16 UARTs being serviced. Likewise, the characters could be sent with more or less than 10 bits per character. The software for implementing the control methods may be stored in ROM, various forms of RAM, or in other computer-readable media in which software can be stored. Accordingly, the invention is only limited as defined in the appended claims.

Note that the flow control operations introduced by this invention work in combination with other flow control mechanisms commonly in use. For example a computer system may request flow control when the computer's receive buffer (which will usually be much bigger than the receive buffer of any one UART) contains more than a specified number of characters (the high water mark) and then release flow control when the number of characters drops below a different number (the low water mark). Such a system utilizing the present invention would request flow control either when the number of characters removed from the UART FIFO exceeded N during a poll session, or when the number of characters in the computer's receive buffer came to exceed the high water mark. Flow control would be released only when both the UART's receive FIFO was found to be empty, and when the number of characters in the computer's receive buffer was below the low water mark.

What is claimed is:

1. An apparatus for receiving data at two or more ports, each port having a buffer capable of holding B units of received data, said two or more ports being serviced by a processor resource, comprising:
   (a) software causing said processor resource to periodically poll each port for a variable period of time ("polling session") and to read unread units of data from the buffer in each port during its polling session;
   (b) a counter for determining the number of units of data that have been read from the buffer; and
   (c) circuitry responsive to said counter to assert flow control from said port based on the number of units of data read from the buffer.

2. The apparatus of claim 1 where the circuitry enforces flow control when the number of units of data read from the buffer exceeds a threshold N.

3. The apparatus of claim 1 wherein the flow control is a software control signal.

4. The apparatus of claim 1 wherein the flow control is a hardware control signal.

5. The apparatus of claim 2 wherein the buffer size is B bytes and N is less than B bytes.

6. The apparatus of claim 5 wherein there are 16 ports with a 230 kilobaud receipt rate and a polling rate of 1440 times/second.

7. The apparatus of claim 2 wherein the processor resource has a nominal polling interval of P character times and N is greater than P.

8. The apparatus of claim 2 wherein N is empirically determined to reduce the probability of buffer overflow to an acceptably low level.

9. The apparatus of claim 1 wherein the buffer is a FIFO buffer.

10. The apparatus of claim 1 wherein each port has a 1665x UART.

11. The apparatus of claim 1 further comprising:
   an indicator for showing whether the buffer contains any unread units of data and de-assert means responsive to the indicator for showing whether the buffer contains any unread units of data and to the counter to de-assert flow control from said port if there are no unread units of data.

12. The apparatus of claim 11 wherein the de-assert means has a threshold that limits the number of de-assert actions that can be taken in any polling interval.

13. The apparatus of claim 12 wherein the processor resource has a nominal polling interval of P character times and N is greater than P and the number of de-assert actions L that can be taken in any polling interval is much less than N.

14. The apparatus of claim 12 wherein N is 16 and L is 2.

15. A method for controlling data received at two or more ports, each port having a buffer capable of holding B units of data and being serviced by a processor resource, comprising:
   (a) causing the processor resource to have a polling session of a variable time duration with each port and to read unread units of data from the buffer in each port during its polling session;
   (b) determining the number of units of data read from the buffer; and
   (c) asserting flow control from said port based on the number of units of data read from the buffer.

16. The method of claim 15 wherein the act of asserting flow control comprises inhibiting the reading of more than N units of data on any one polling session and asserting flow control from said port if N units of data are read.

17. The method of claim 15 wherein the act of asserting flow control comprises providing a software control signal.

18. The method of claim 15 wherein the act of asserting flow control comprises providing a hardware control signal.

19. The method of claim 15 wherein the act of causing the processor resource to have a polling session with each port and to read unread units of data from the buffer comprises polling a buffer whose size is B bytes and the act of inhibiting the reading of more than N units of data utilizes an N value less than B.

20. The method of claim 18 wherein the act of causing the processor resource to have a polling session with each port and to read unread units of data from the buffer in each port comprises polling and reading from 16 ports with a 230 kilobaud receipt rate at each port and the act of inhibiting the removal of more than N units of data comprises inhibiting removal of more than 19 bytes.

21. The method of claim 16 further comprising empirically determining the number N to reduce the probability of buffer overflow to an acceptably low level.

22. The method of claim 15 wherein the act of causing the processor resource to have a polling session with each port and to read unread units of data from the buffer comprises polling a FIFO buffer.

23. The method of claim 15 wherein the act of causing the processor resource to have a polling session with each port and to read unread units of data from the buffer comprises polling and reading from a port that has a 1665x UART.

24. The method of claim 15 further comprising determining whether the buffer contains any unread units of data and de-asserting flow control from said port if there are no unread units of data and N units of data have not been read.

25. A computer-readable medium whose contents cause a processor resource to control data received at two or more ports, each port having a buffer capable of holding B units of data and being serviced by a processor resource, by performing a method comprising:

(a) causing the processor resource to have a polling session of a variable time duration with each port and to read unread units of data from the buffer in each port during its polling session;

(b) determining the number of units of data read from the buffer; and (c) asserting flow control from said port based on the number of units of data read from the buffer.

26. The method of claim 24 wherein the act of asserting flow control comprises inhibiting the reading of more than N units of data on any one polling session and asserting flow control from said port if N units of data are read.

27. The computer-readable medium of claim 24 comprises providing a hardware control signal.

28. The computer-readable medium of claim 24 wherein the act of causing the processor resource to have a polling session with each port and to read unread units of data from the buffer comprises polling a buffer whose size is B bytes and the act of inhibiting the reading of more than N units of data utilizes an N value less than B.

29. The computer-readable medium of claim 27 wherein the act of causing the processor resource to have a polling session with each port and to read unread units of data from the buffer in each port comprises polling and reading from 16 ports with a 230 kilobaud receipt rate at each port and the act of inhibiting the removal of more than N units of data comprises inhibiting removal more than 19 bytes.

30. The computer-readable medium of claim 25 wherein the act of causing the processor resource to have a polling session with each port and to read unread units of data from the buffer comprises polling a buffer whose size is B bytes and the act of inhibiting the reading of more than N units of data utilizes an N value less than B minus a number of bytes corresponding to the worst case latency of the flow control.

31. The computer-readable medium of claim 25 wherein the method performed further comprises empirically determining the number N to reduce the probability of buffer overflow to an acceptably low level.

32. The computer-readable medium of claim 24 wherein the act of causing the processor resource to have a polling session with each port and to read unread units of data from the buffer comprises polling a FIFO buffer.

33. The computer-readable medium of claim 24 wherein the act of causing the processor resource to have a polling session with each port and to read unread units of data from the buffer comprises polling and reading from a port that has a 1665x UART.

* * * * *